(12) United States Patent
Johnson et al.

(10) Patent No.: US 10,801,692 B2
(45) Date of Patent: Oct. 13, 2020

(54) AUXILIARY LIGHT

(71) Applicant: Bestop Baja, LLC, Louisville, CO (US)

(72) Inventors: Christopher C. Johnson, San Marcos, CA (US); Alan R. Roach, Escondido, CA (US)

(73) Assignee: Bestop Baja, LLC, Louisville, CO (US)

( * ) Notice: Subject to any disclaimer, the term of this patent is extended or adjusted under 35 U.S.C. 154(b) by 3 days.

(21) Appl. No.: 16/141,311

(22) Filed: Sep. 25, 2018

(65) Prior Publication Data

US 2019/0093851 A1 Mar. 28, 2019

Related U.S. Application Data

(60) Provisional application No. 62/562,869, filed on Sep. 25, 2017.

(51) Int. Cl.
| | | |
|---|---|---|
| *B60Q 1/04* | (2006.01) | |
| *F21S 45/43* | (2018.01) | |
| *F21S 45/48* | (2018.01) | |
| *F21S 41/141* | (2018.01) | |
| *F21S 41/36* | (2018.01) | |
| *F21S 41/275* | (2018.01) | |

(Continued)

(52) U.S. Cl.
CPC ............ *F21S 45/43* (2018.01); *B60Q 1/0023* (2013.01); *B60Q 1/0483* (2013.01); *B60Q 1/18* (2013.01); *B60Q 1/24* (2013.01); *F21S 41/141* (2018.01); *F21S 41/143* (2018.01); *F21S 41/153* (2018.01); *F21S 41/19* (2018.01); *F21S 41/24* (2018.01); *F21S 41/275* (2018.01); *F21S 41/28* (2018.01); *F21S 41/29* (2018.01); *F21S 41/321* (2018.01); *F21S 41/322* (2018.01); *F21S 41/36* (2018.01); *F21S 43/14* (2018.01); *F21S 43/315* (2018.01); *F21S 43/37* (2018.01); *F21S 43/40* (2018.01); *F21S 45/48* (2018.01); *F21S 45/49* (2018.01); *F21S 45/50* (2018.01); *B60Q 2400/30* (2013.01); *F21W 2102/00* (2018.01); *F21W 2103/55* (2018.01); *F21Y 2115/10* (2016.08)

(58) Field of Classification Search
CPC .. F21S 41/36; F21S 45/43; F21S 45/49; F21S 41/321; B60Q 1/24
See application file for complete search history.

(56) References Cited

U.S. PATENT DOCUMENTS

D640,819 S 6/2011 Pan
9,829,182 B1 * 11/2017 McCaslin ............. F21V 21/084
(Continued)

FOREIGN PATENT DOCUMENTS

JP 2012022807 A 2/2012
KR 101251079 B1 4/2013
(Continued)

*Primary Examiner* — Karabi Guharay
(74) *Attorney, Agent, or Firm* — Warn Partners, P.C.

(57) ABSTRACT

A lighting assembly that provides integrated forward projecting light and side lighting to give a user a broader field of light. The assembly also incorporates daytime running lights to increase visibility during the day and night. The lighting assembly includes a cooling system suitable for dissipating the heat generated by light sources and electrical components of the assembly.

20 Claims, 12 Drawing Sheets

(51) Int. Cl.

| | | |
|---|---|---|
| *F21S 41/24* | (2018.01) |
| *F21S 41/32* | (2018.01) |
| *F21S 43/37* | (2018.01) |
| *B60Q 1/00* | (2006.01) |
| *F21S 45/50* | (2018.01) |
| *F21S 43/14* | (2018.01) |
| *F21S 43/40* | (2018.01) |
| *F21S 41/153* | (2018.01) |
| *B60Q 1/24* | (2006.01) |
| *B60Q 1/18* | (2006.01) |
| *F21S 41/143* | (2018.01) |
| *F21S 41/29* | (2018.01) |
| *F21S 41/19* | (2018.01) |
| *F21S 41/20* | (2018.01) |
| *F21S 43/31* | (2018.01) |
| *F21S 45/49* | (2018.01) |
| *F21Y 115/10* | (2016.01) |
| *F21W 102/00* | (2018.01) |
| *F21W 103/55* | (2018.01) |

(56) References Cited

U.S. PATENT DOCUMENTS

2015/0323147 A1\* 11/2015 Kanayama .............. F21V 11/16
                                                              362/487
2017/0327027 A1\* 11/2017 Takaya .................. F21S 41/148

FOREIGN PATENT DOCUMENTS

| KR | 20150128313 A | 11/2015 |
|---|---|---|
| KR | 101707890B1 B1 | 2/2017 |
| TW | D161541 | 7/2014 |
| TW | D175903 | 5/2016 |
| TW | D188091 | 1/2018 |

\* cited by examiner

AUXILIARY LIGHT

CROSS-REFERENCE TO RELATED APPLICATIONS

This application claims the benefit of U.S. Provisional Application No. 62/562,869, filed Sep. 25, 2017. The disclosures of the above application are incorporated herein by reference.

FIELD OF THE INVENTION

The present invention relates to a forward projecting and side lighting device for mounting to a motor vehicle.

BACKGROUND OF THE INVENTION

Traditional lights are only forward projecting and do not provide useable light except for what is directly in front. Also, a problem with forward projecting lighting is finding a way to dissipate the heat generated by the light and electrical components. Lights generally create so much heat that typically lights have been designed to dissipate heat on the front, side or rear or a combination of those. Additionally, other lights are either on or off with no dimming features or daytime running lights.

A known light attempts to solve integrated side lighting. This light has a smaller size, is square or has a square shaped front, and disperses light differently. Further, the light dispersed by the known light's side projecting optics has undesirable harsh cutoffs throughout the field of view.

In addition, while known lights may have daytime running lights, the present invention is unique in that no optics are used over the daytime running light LEDs, unlike known lights.

Accordingly, there exists a need for a lighting assembly that quickly dissipates heat and provides a forward projecting light with also built in side lighting to give the user a broader field of view of light.

SUMMARY OF THE INVENTION

The present invention provides a lighting assembly that provides integrated forward projecting light and side lighting to give a user a broader field of light. The assembly also incorporates daytime running lights to increase visibility during the day and night.

The assembly includes a cooling system suitable for dissipating the heat generated by light sources and electrical components of the assembly. The lighting assembly incorporates air channels that force air to be directed through the light and against cooling fins inside these channels providing the most efficient non-mechanical forms of cooling. The air is directed into and through the cooling ducts where the flow of air is uninterrupted and nearly invulnerable to vortices forming. This also helps prevent hot air from getting trapped in vertices on the backside of the light. A circuit board is also provided that is controlled by a 4 wire power chord going into the back of the light. In low mode, a portion of forward projecting light sources, e.g., light emitting diodes (LEDs), turn off, and in high mode all the light sources are turned on.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, the present invention provides a forward projecting light that has not only forward projecting light but also built in side lighting to give the users a broader field of view of light without having to purchase additional lights. Also, to address heat dissipation, the present invention provides a cooling system that directs the flow of air directly through the light allowing for quicker dissipation of heat in static and non-static applications. The cooling system includes at least one continuous hole from the front of the light where the air enters, to the rear of the light where the air passes out the back and across the rear cooling fins. It is understood that the at least one hole may be located in any alternative predetermined location(s) suitable for dissipation of heat from the light according to the particular application without departure from the scope of the present invention. It is further understood that alternative rear cooling features can be used, e.g., straight and/or curved webs, ridges, ribs, protrusions, etc, and combinations thereof, suitable for dissipation of heat from the light to the atmosphere without departure from the scope of the present invention. The present invention also provides at least one high/low feature where a portion of forward projecting light sources (preferably, 6 out of 9) turn off in the low mode. On high power, more light sources are turned on (e.g., 9). It is understood that the light may have more or less light sources without departure from the scope of the present invention. Further, it is understood that while 6 out of 9 is exemplary for low mode, more or less than 6 light sources may be turned off in the low mode. It is also understood that more or less modes are contemplated depending on the particular application without departure from the scope of the present invention (e.g., on/high/low/off, highest/lowest plus at least one medium mode therebetween, daytime running/low/high, etc and any combinations thereof). The light source(s) are preferably LEDs. However, any other suitable light source is contemplated without departure from the scope of the present invention. In addition, the present invention includes at least one daytime running light on the inside of the light to increase visibility of the motor vehicle that the lights are mounted on no matter the time of day or night.

The present invention is operably mountable to a surface, including, but not limited, to a motor vehicle (such as a pickup truck, off-road vehicle, race vehicle, motorcycle, military vehicle, construction vehicle, SUV, UTV), construction equipment, work space, etc. The present invention is operable for use in predetermined visibility for driving, spot lighting, any other lighting suitable and combinations thereof.

The light assembly includes at least one mounting bracket, preferably, a single mounting bracket suitable for mounting to a surface and shaped to decrease welds in manufacturing to achieve structural strength of the bracket and also to direct air to the light, preferably, direct ambient air up the back of the light assembly.

The present invention provides suitable amounts of light sources, lumens, watts, light dispersions, etc. for forward projection and side lighting depending on the particular application. A plurality of light sources for forward projection (preferably, LEDs; most preferably, 9 LEDs), produce lumens generally in the range of about 8,000 to 15,000; typically, about 10,000 to 13,000; preferably, about 10,800 to 12,000; most preferably, 11,025 Lumens total. The plurality of light sources for forward projection (preferably, LEDs; most preferably, 9 LEDs), produce watts generally in the range of about 40 to 150; typically, about 60 to 150; preferably, about 75 to 150; most preferably, 105 Watts. Preferably, 7.6 Amps. A plurality of light sources for side lighting (preferably, LEDs; most preferably, 6 LEDs), produce lumens generally in the range of about 500 to 3000; typically, about 700 to 2000; preferably, about 900 to 1500; most preferably, 1140 Lumens per side. The plurality of light sources for side lighting (preferably, LEDs; most preferably, 6 LEDs), produce watts generally in the range of about 10 to 20; preferably, 10.5 Watts per side. Preferably, 0.76 Amps. The side lighting provides predetermined high intensity light and predetermined lower intensity light dependant on the application. The high intensity light is generally about 90 to 175°; typically, about 10 to 150°; preferably, about 120 to 140°; most preferably, 135°. The lower intensity light is generally about 20 to 115°; typically, 40 to 80°; preferably, 50 to 75°; most preferably 65°. The light assembly provides useable light (e.g., including the forward projecting and side lighting) of generally about 10 to 300°; typically, about 150 to 250°; preferably, 175 to 225°; more preferably, 190 to 210° most preferably, 200°. Most preferably, the forward projecting in combination with the integrated peripheral lighting provides at least about 200° spread of usable light.

The light assembly is effective for selectively providing at least a day-time running light, low power mode and high power mode.

The plurality of light sources (forward projecting) are arranged in at least two columns, preferably, three columns. Most preferably, the light sources are arranged in three columns (e.g., generally vertically arranged columns when in an environment of use) with immediately adjacent columns being staggered. More or less columns and more or less light sources within each column are contemplated depending on the application without departure from the scope of the present invention. Alternatively, the light sources are arranged in columns that are not staggered. Alternatively, the light sources are arranged in generally straight rows and immediately adjacent rows are staggered. Alternatively, the light sources are arranged in generally straight rows and immediately adjacent rows are not staggered. Any alternative lighting arrangement suitable for desired predetermined forward projecting is contemplated depending on the application without departure from the scope of the present invention.

The plurality of light sources (side projecting) are arranged in at least one column per side. Most preferably, the light sources are arranged in one column (e.g., generally vertically arranged) per side. In a preferred arrangement, there is one column per side, where each column has three light sources (equaling three light sources on one side and three light sources on the opposite side—with the forward projecting section therebetween). More or less columns per side and more or less light sources within each column are contemplated depending on the application without departure from the scope of the present invention. Any alternative lighting source arrangement suitable for desired predetermined side projecting is contemplated depending on the application without departure from the scope of the present invention.

The light assembly has at least one housing that is machined aluminum, hard anodized machined aluminum or cast aluminum. Preferably cast aluminum. Other materials are contemplated depending on the application without departure from the scope of the present invention.

The light assembly has at least one bezel that billet machined aluminum or cast aluminum. Preferably cast aluminum. Other materials are contemplated depending on the application without departure from the scope of the present invention.

The light assembly has at least one mounting bracket that is metal (e.g., stainless steel). Most preferably, the at least one mounting bracket is powder coated black steel. Other materials are contemplated depending on the application without departure from the scope of the present invention.

The light assembly has at least one lens that is hard coated polycarbonate. Other materials are contemplated depending on the application without departure from the scope of the present invention. The lens can be substantially clear or tinted, e.g., amber color, transparent or translucent. Other lens optics are contemplated depending on the application without departure from the scope of the present invention. The lens can include surface treatment (e.g., embossed, laser cut/sketched features, etc) molded in features or colors, and/or film features (e.g., embossed design(s), logo, etc.) that are operably backlit for viewability.

The light sources emit white, color (e.g., amber, blue, red, etc), flashing, non-flashing and/or combinations thereof light, depending on the application without departure from the scope of the present invention. Preferably, white.

Incorporating a light sensor and corresponding auto ON and/or OFF features are contemplated without departure from the scope of the present invention.

The light assembly provides a watertight seal with the lens, housing and bezel.

The present invention provides a seamless side lighting through proprietary reflector geometry to project the light exactly where it is desired. One of the ways this is achieved is by how far the arc protrudes in front of the LED reflecting more of the light to the sides and less light forward where the center light is aimed. This increases intensity on the side lighting and makes the beam pattern smoother since the intensity of the main beam and side lighting are now closer in intensity. This coupled with the increased height and proprietary combination of shapes generates the smooth light dispersion.

Unlike traditional light cooling systems, the present invention's cooling system forces air to be directed through the light and against the cooling fins inside channels of the cooling system thereby providing the most efficient non-mechanical form of cooling. The major problem with just having cooling fins on the back of a light is the air flow is not directly passing over the cooling fins. In most cases the air coming around the light keeps going while a small amount is drawn in by one or multiple vortices that form. This traps hot air in and decreases cooling efficiency. With the cooling system of the present invention the air is directed into and through cooling ducts where the flow of air is uninterrupted and nearly invulnerable to vortices forming. This also helps prevent hot air from getting trapped in vertices on the backside of the light because the air flow coming through the light helps push and draw any air on the backside away from the light. To address the high/low feature of the light, this is built into the function of the circuit board that is controlled by a power source, e.g., 4 wire power chord going into the back of the light. By way of non-limiting example, in low mode 6 out of the 9 forward projecting lights turn off, and, in high mode all LEDs are turned on.

Referring now to FIGS. 1-10 generally, the present invention provides a lighting assembly 10 (or "assembly") that provides integrated forward projecting light and side lighting to give a user a broader field of light. The assembly 10 includes a cooling system, indicated generally at 12, suitable for dissipating the heat generated by a plurality of light sources 14 and electrical components of the assembly 10. The assembly 10 also provides a daytime running light mode to increase visibility during the day and night.

The lighting assembly 10 has at least one housing 16 (preferably, a rear housing) operably connected to at least one bezel 18 (preferably, a front bezel). Preferably, at least one mounting bracket 20 is operably connected to the housing 16 or bezel 18, most preferably to the housing 16, by a plurality of fasteners (e.g., bolts 22 and washers 24). The mounting bracket 20 is mountable to a surface (such as, but not limited to, a surface of a motor vehicle component, secondary component, bumper bar, roof rail or bar, windshield frame, bumpers, lights, light bars, roll cages, sport bars, sport utility vehicles, pickup trucks, trucks, motorcycles, all terrain vehicles, utility task vehicles, off road vehicles, recreational vehicles, motor craft, industrial vehicles, equipment, workspace, etc), using at least one fastener 26.

The cooling system 12 of the assembly 10 includes at least one heat transport feature generally shown at 28, e.g., cooling channel(s), and at least one heat dissipating member 30, e.g. cooling fin(s). Preferably, the housing 16 and the bezel 18, when aligned and coupled together, form each of the at least one heat transport features 28.

Each heat transport feature 28 comprises at least one air channel 36, most preferably, a plurality of air channels 36. While four groups of four air channels 36 are depicted, it is understood that more or less air channels 36 are contemplated depending on the application without departure from the scope of the present invention. Most preferably, the air channels 36 are direct duct cooling channels.

The at least one heat dissipating member 30 is disposed on the housing 16. Each heat dissipating member 30 is preferably a cooling fin. Most preferably, the housing 16 has a plurality of cooling fins 30. The cooling fins 30 are preferably generally rearward projecting in a direction generally away from the front of the assembly 10.

In addition, at least one open channel 32 is formed on the bezel 18, which further assists with cooling. Preferably, a plurality of open channels 32 are formed in a generally fore/aft direction in an outer surface 34 of the bezel 18. While four groups of four open channels 32 are depicted, it is understood that more or less open channels 32 can be used depending on the application without departure from the scope of the present invention.

Each of the plurality of air channels 36, most preferably direct duct cooling channels, has a first opening 38 at front surfaces 40 of the bezel 18 and a second opening 42 at a rear surface 44 of the housing 16. Alternative placement of the openings are contemplated suitable for providing cooling depending on the application without departure from the scope of the present invention.

The housing 16 is the base of the entire light 10 that each component is operably secured to, such as a connector 46 (e.g., 4-pin connector 46) by at least one fastener 48 (e.g., by a plurality of screws). Two other functions of the rear housing 16 are to dissipate heat through the cooling fins 30 formed on at least the back and the air channels 36 in each of the four corners, as well as provide a way for the mounting bracket 20 to be bolted to the light assembly 10 Preferably, the mounting bracket 20 is bolted through two tapped apertures 50,52 on each side of the housing 16 and the mounting bracket 20, respectively, and using fasteners 22 (e.g., bolts and flat washers 24).

Preferably, the cooling fins 30 that cross over the openings 42 of each heat transport feature also extend through the heat transport feature forming a plurality of channels 36 and dissipating heat.

While four openings 38 and four second openings 42 for four groups of four air channels 36 are depicted toward the corners of the bezel 18, it is understood that more or less groups, and more or less channels 36 per group, and alternative predetermined locations on the bezel 18 (and housing 16) are contemplated depending on the application without departure from the scope of the present invention. It is further understood that, alternatively, the air channels 36 can be curved or have any other predetermined geometry and path through the assembly 10 without departure from the scope of the present invention.

Figure 10:
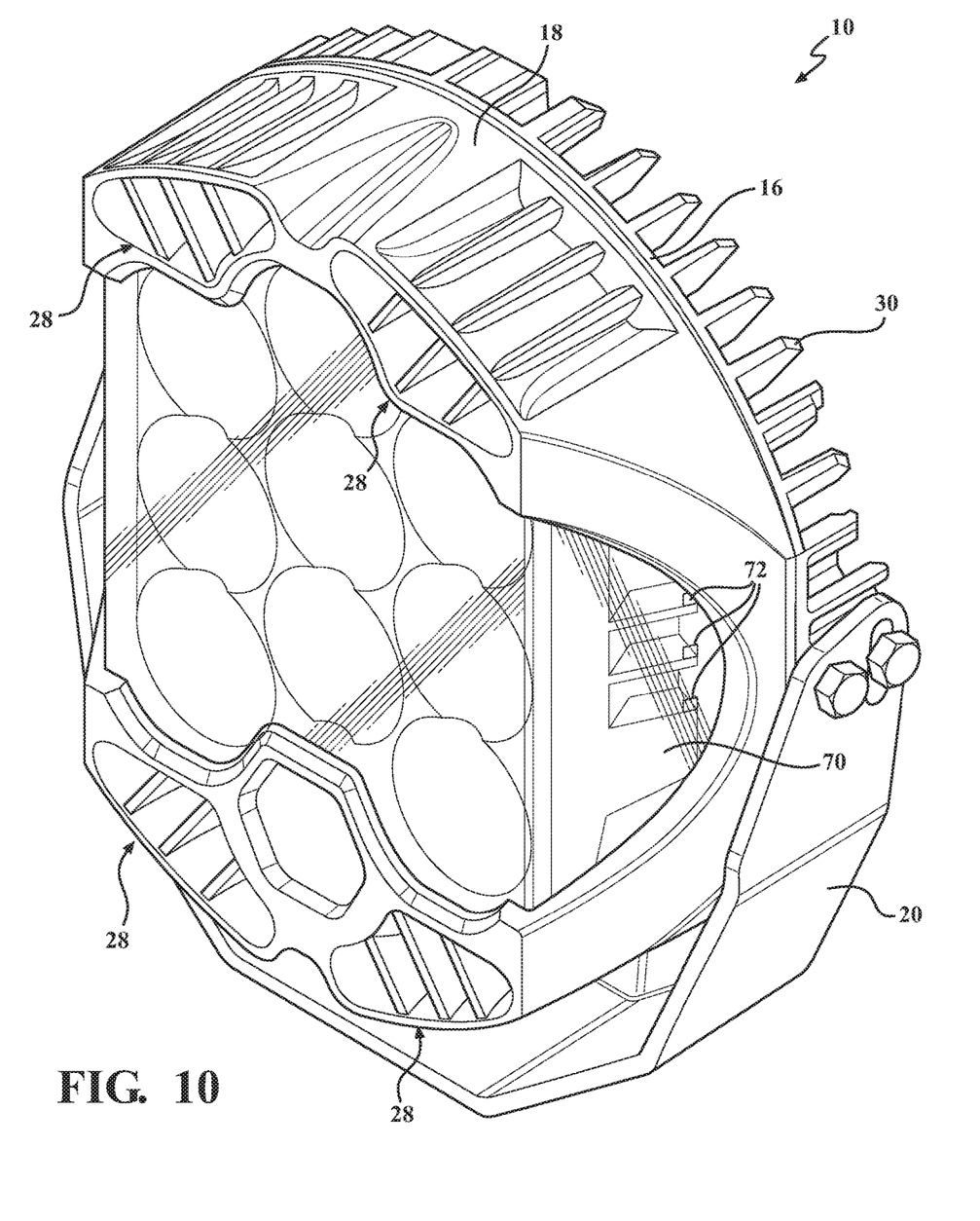
FIG. 10 is a front perspective view of the lighting assembling depicting a mounting bracket, according to the present invention.
Figure 11:
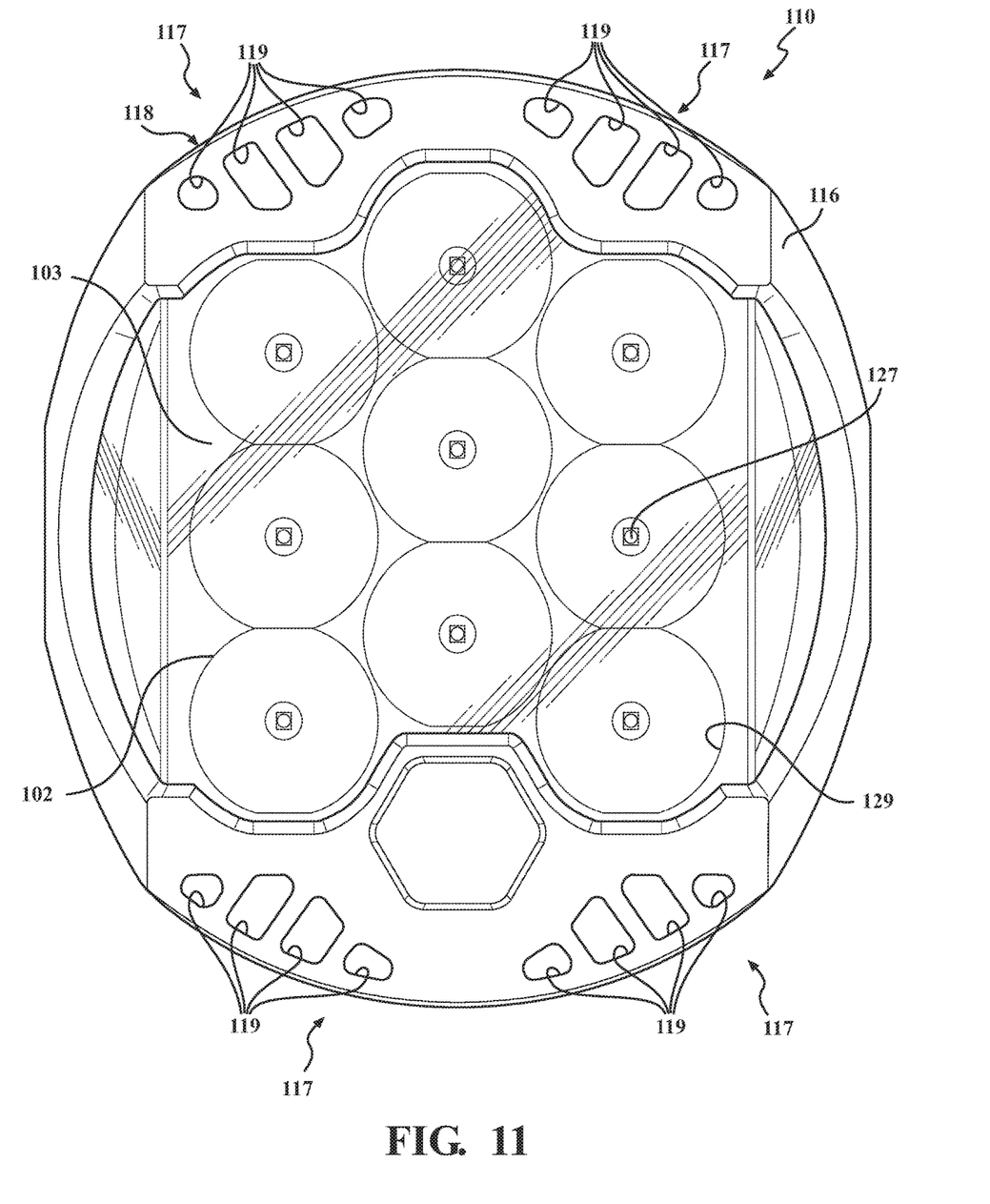
FIG. 11 is a front elevation view of a lighting assembly, according to another embodiment of the present invention.
Figure 12:
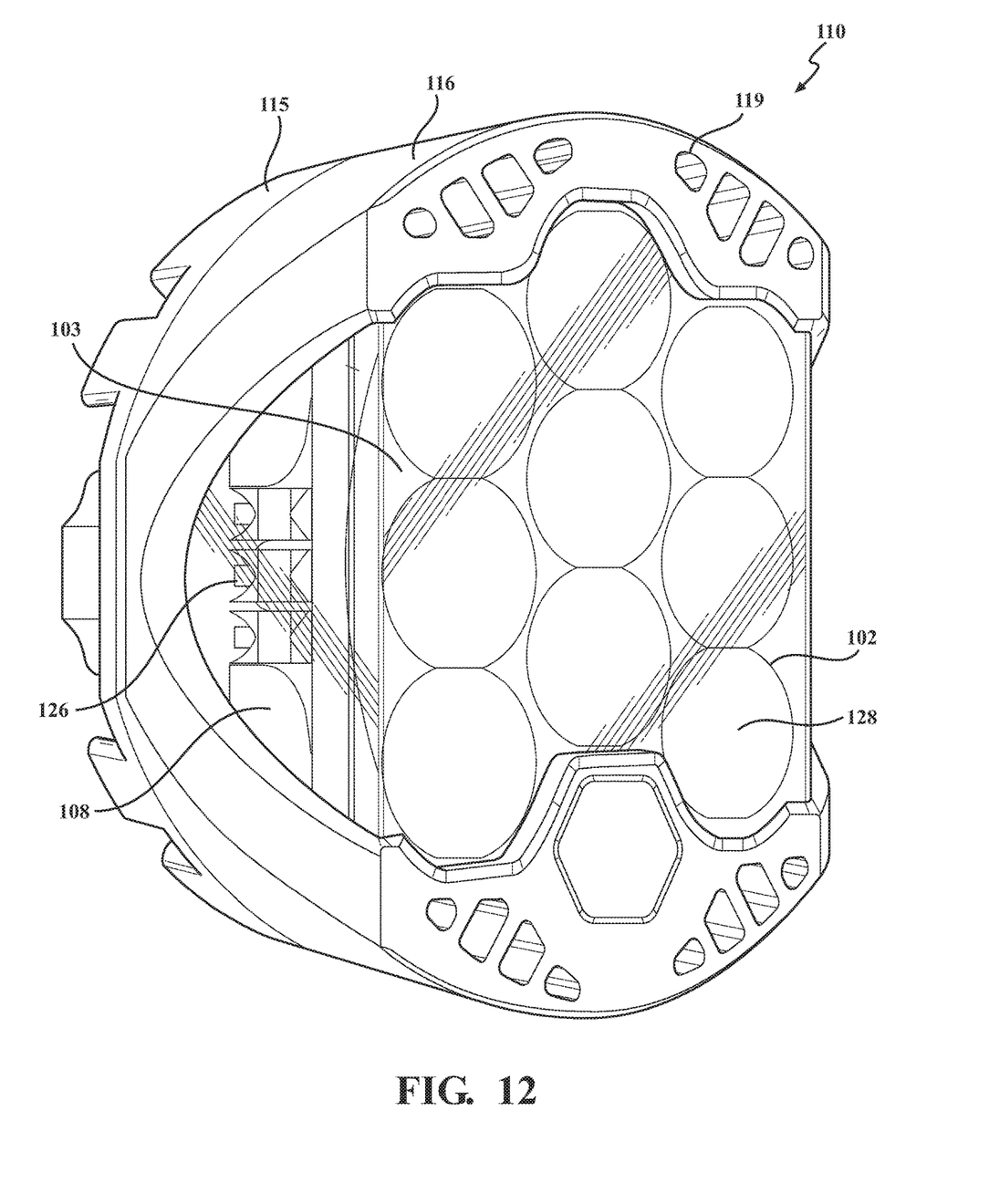
FIG. 12 is a front perspective view of the lighting assembly of FIG. 11, according to the present invention.
Figure 13:
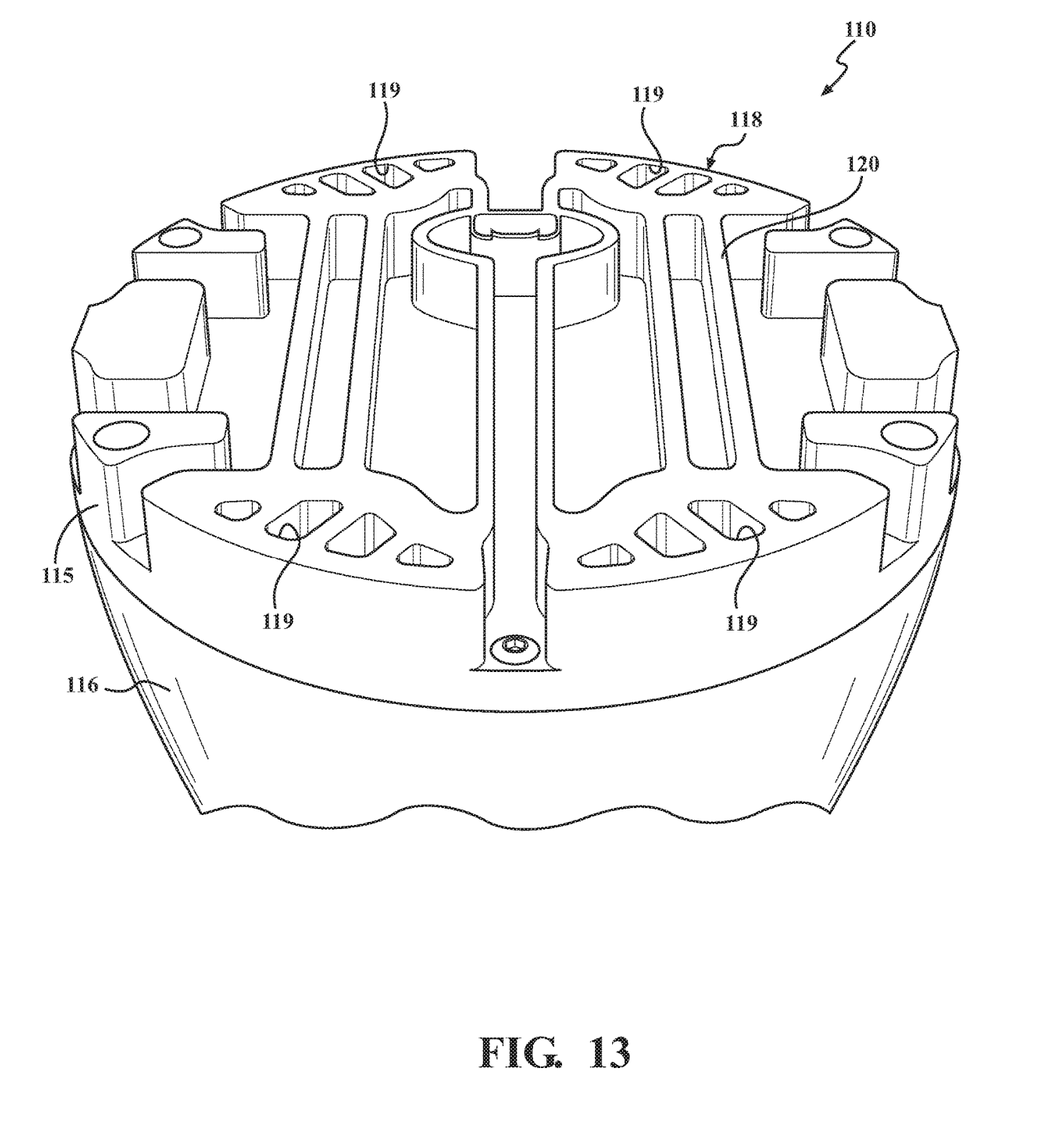
FIG. 13 is a rear perspective view of the lighting assembly of FIGS. 11-12, according to the present invention.

The mounting bracket 20 can then be secured to a surface, e.g., vehicle bumper, using fasteners (e.g., bolts 54 and washers 56).

Figure 1:
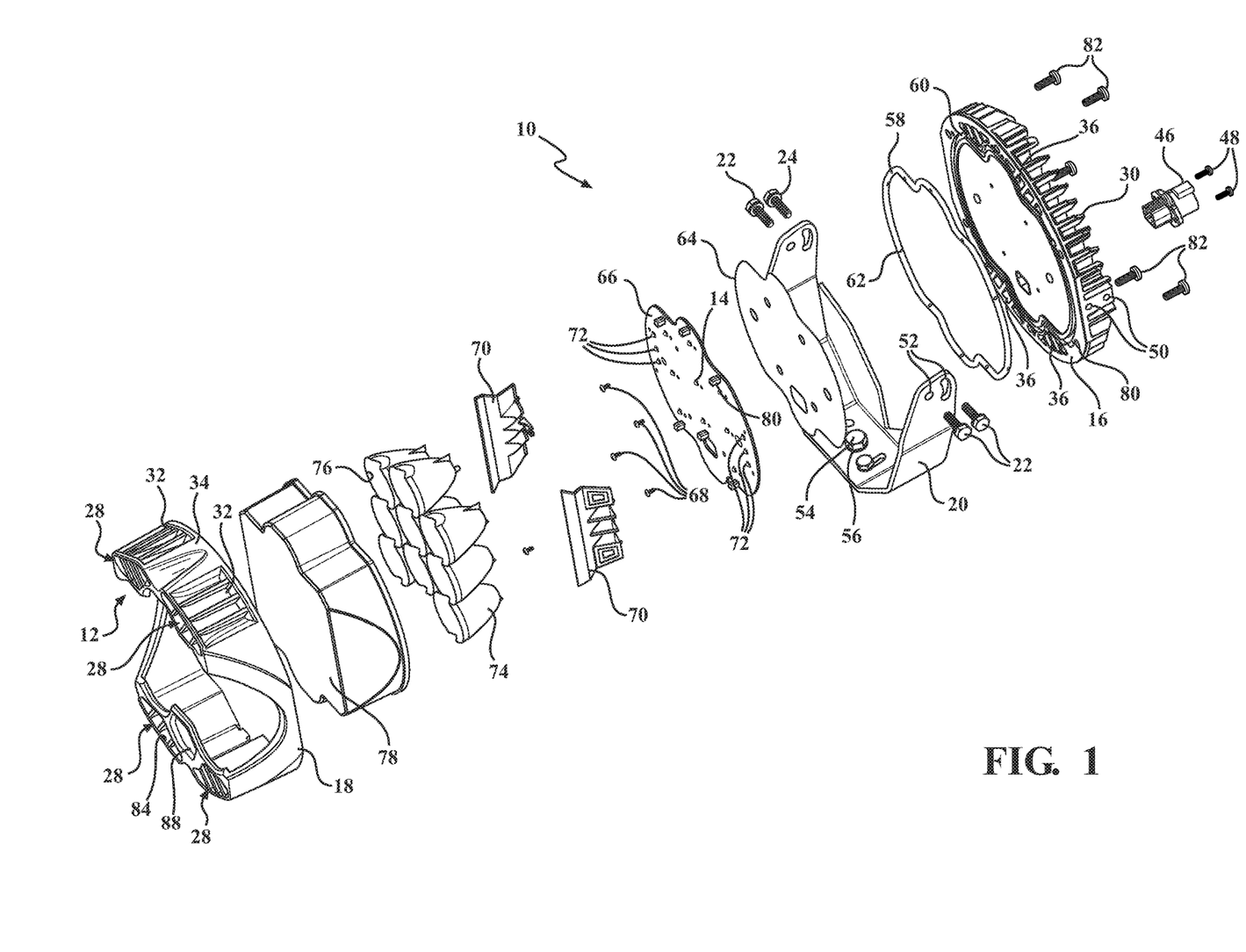
FIG. 1 is an exploded perspective view of a lighting assembly, in accordance with the present invention.
Figure 2:
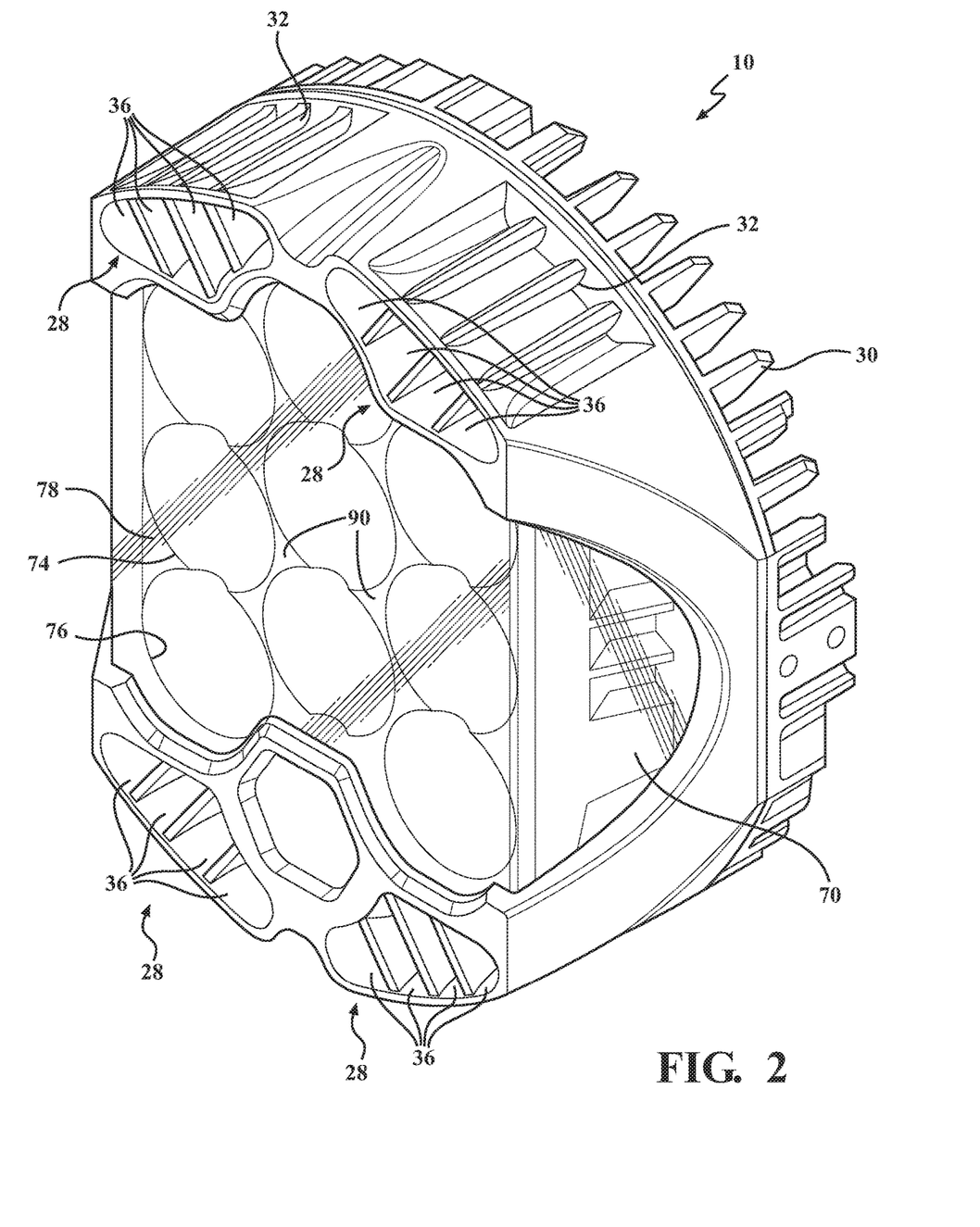
FIG. 2 is a perspective view of the lighting assembly, according to the present invention.
Figure 3:
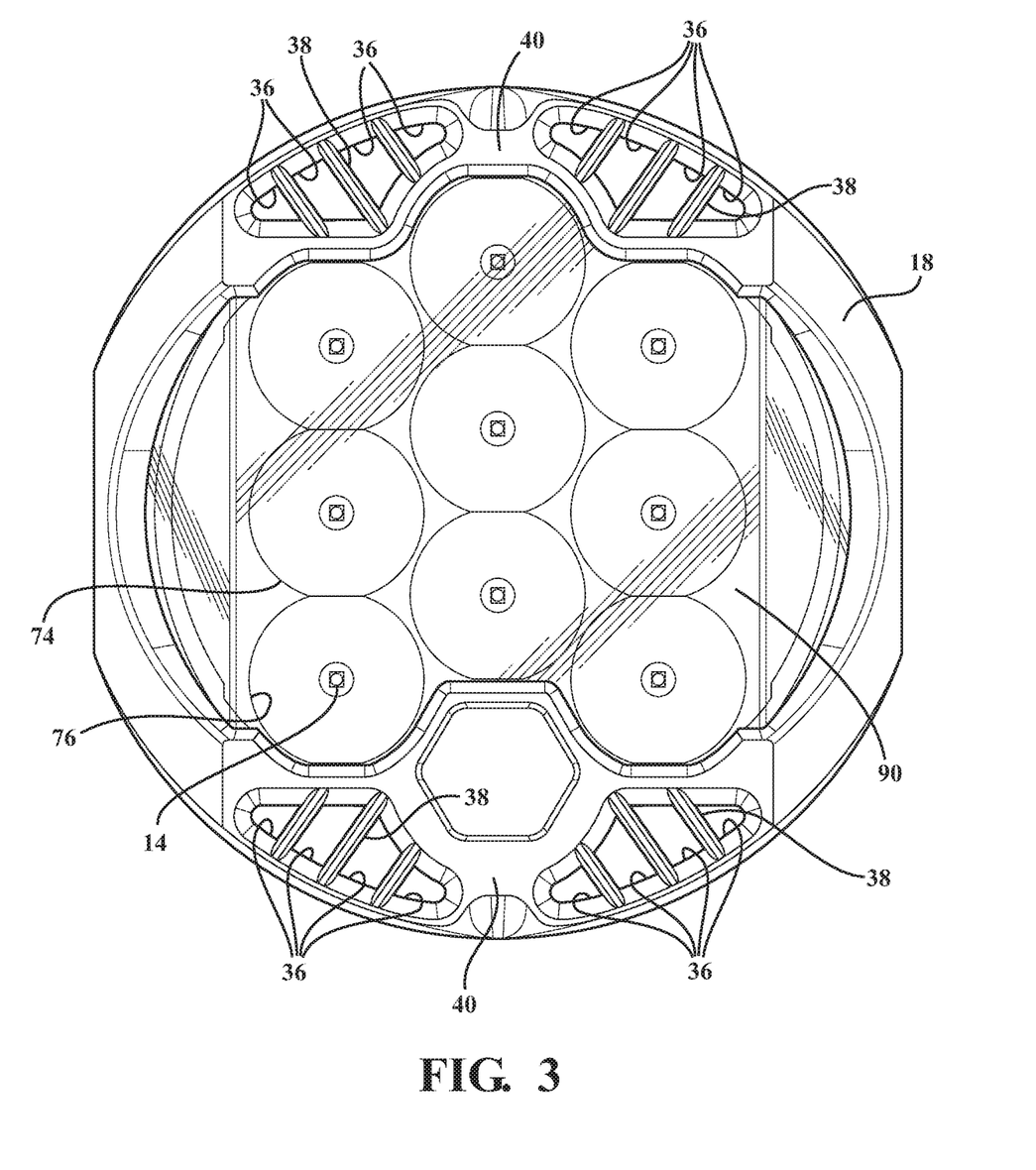
FIG. 3 is a front elevation view of the lighting assembly, according to the present invention.
Figure 4:
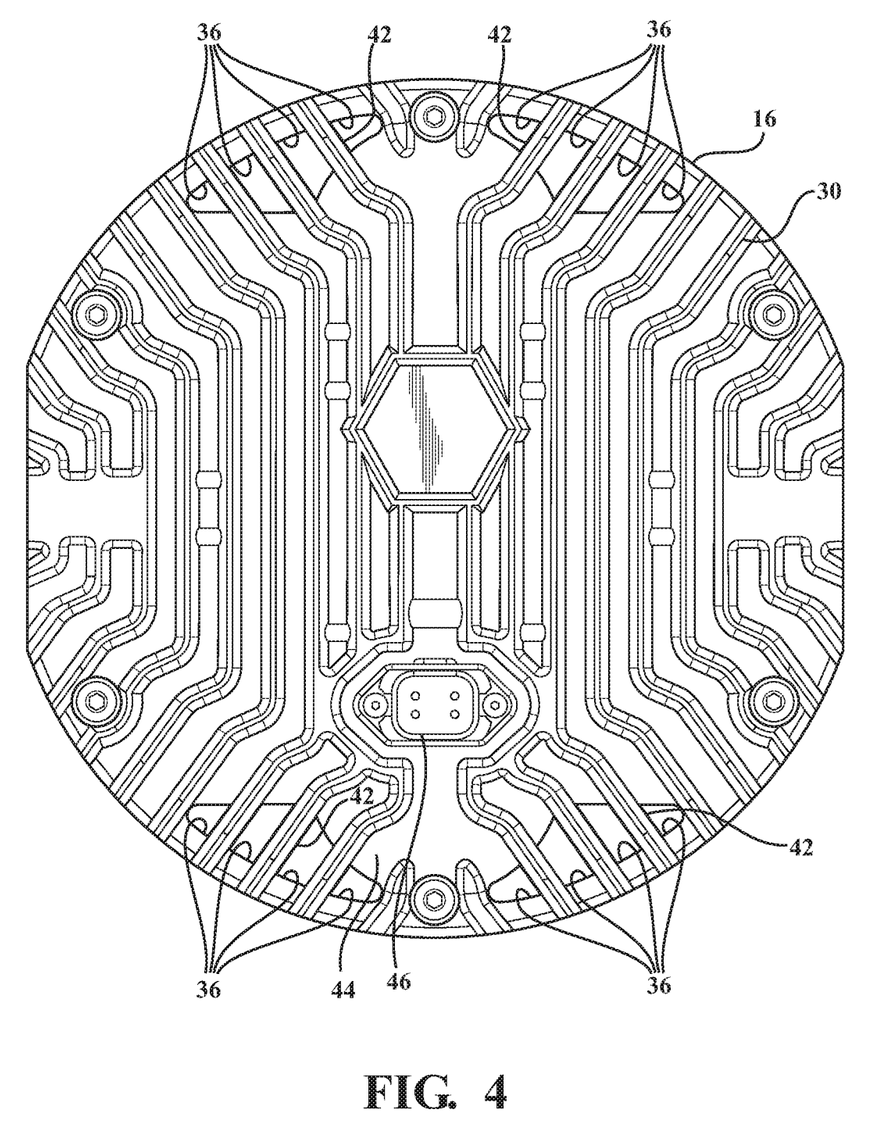
FIG. 4 is a back elevation view of the lighting assembly, according to the present invention.
Figure 5:
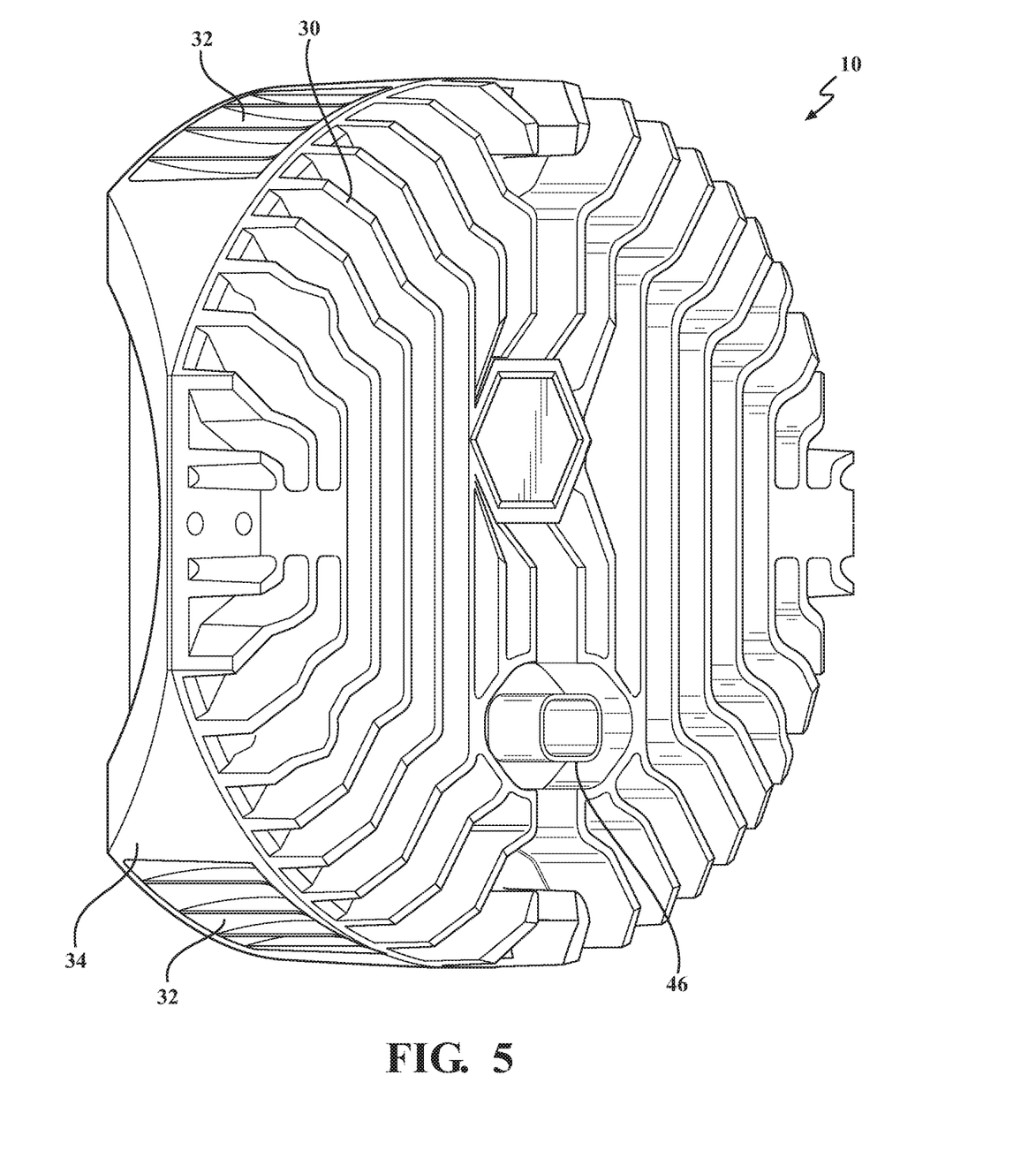
FIG. 5 is a rear perspective view of the lighting assembly, according to the present invention.
Figure 6:
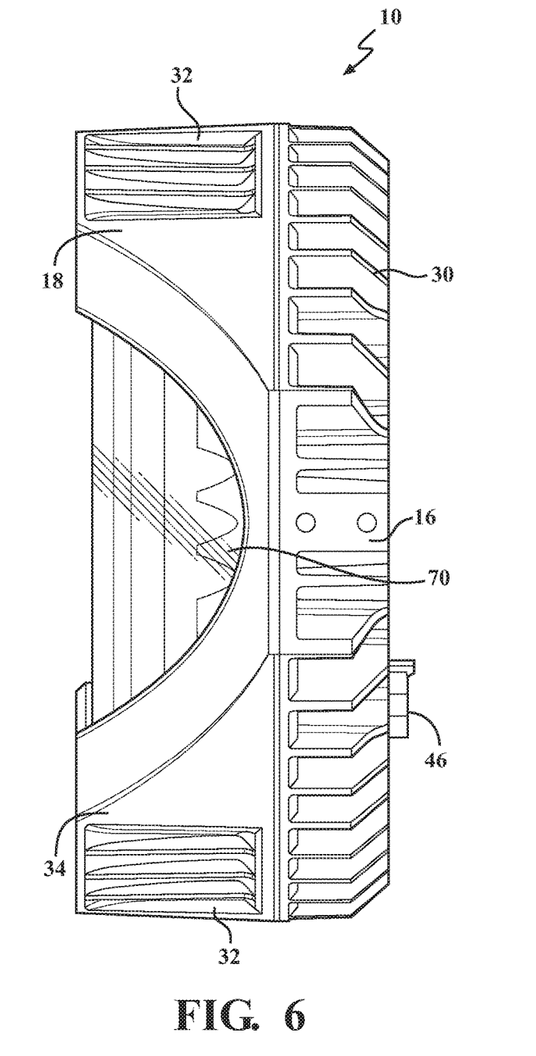
FIG. 6 is a left side elevation view of the lighting assembly, according to the present invention.
Figure 7:
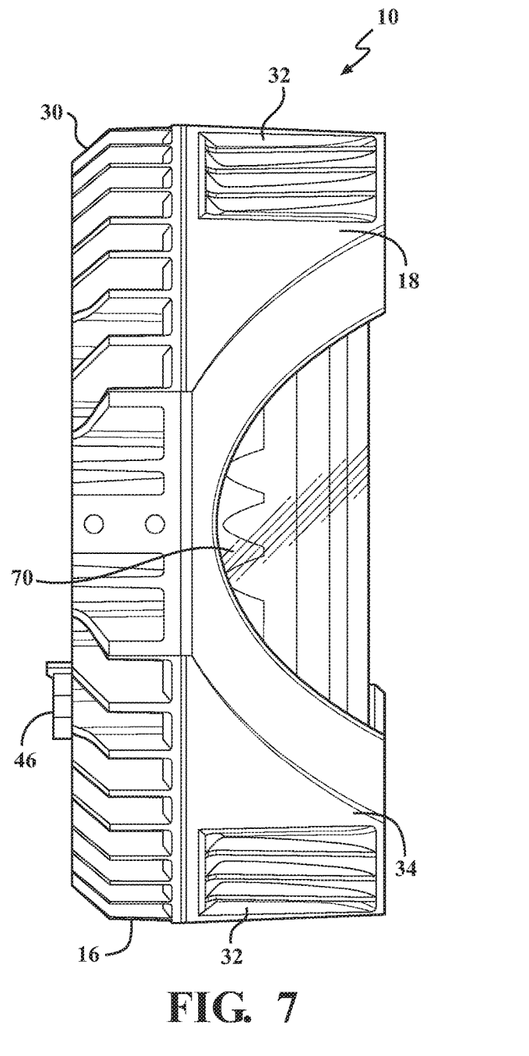
FIG. 7 is a right side elevation view of the lighting assembly, according to the present invention.
Figure 8:
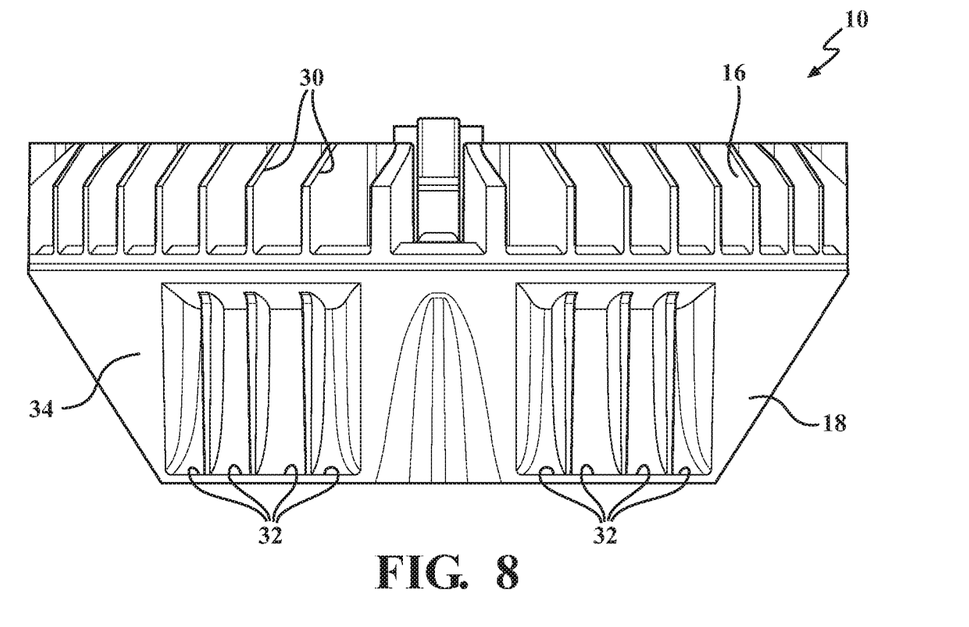
FIG. 8 is a bottom elevation view of the lighting assembly, according to the present invention.
Figure 9:
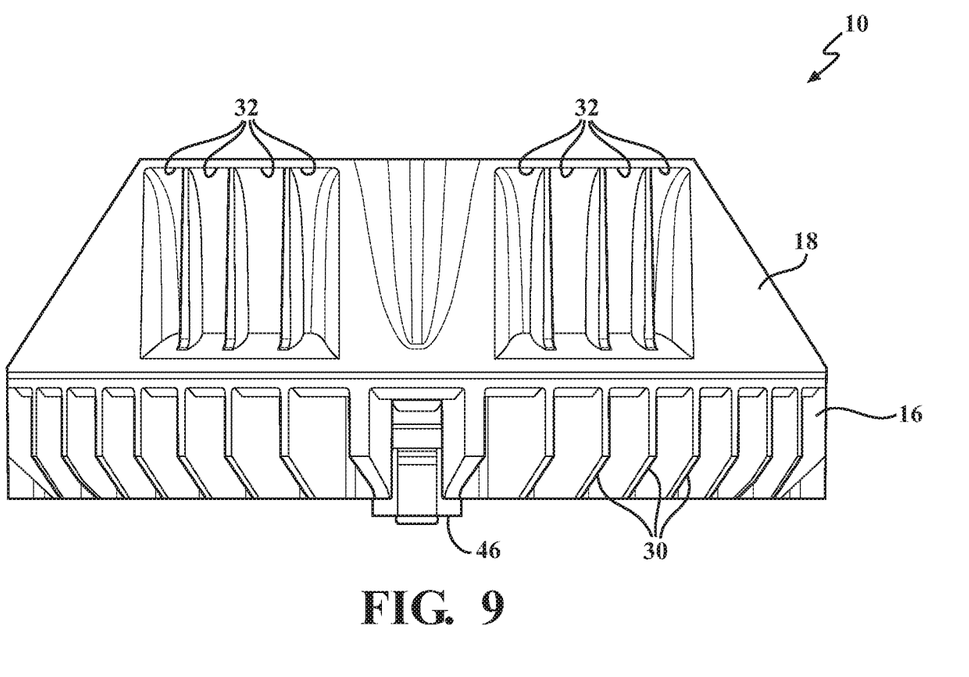
FIG. 9 is a top elevation view of the lighting assembly, according to the present invention.

At least one O-ring 58 is operably mounted to the housing 16. Preferably, an O-ring 58 is installed into an O-ring groove 60 in the housing 16 and has a plurality of pressure in place features (PIPs) 62 to hold itself in place during assembly. The pips 62 are small tabs designed into the O-ring 60 that compress when pushed into the groove 60 in the housing 16 creating pressure to hold the O-ring 58 in place. Alternative seal(s) and predetermined location(s) are contemplated without departure from the scope of the present invention.

At least one thermal interface 64, which is preferably a thermal gap pad, is operably placed on the front of the housing 16. The thermal gap pad 64 has a primary function of drawing the heat from a circuit board 66. The circuit board 66 is mounted on top of the thermal gap pad 64 using a plurality of fasteners 68, e.g., four board screws, secured to the rear housing 16 wherein the heat is dissipated into the surrounding air via the cooling fins 20. The plurality of lighting sources 14 are operably mounted to the circuit board 66.

At least two reflectors 70, preferably a pair of reflectors 70, are operably mounted to the circuit board 66 around a plurality of light sources 14 that are side projecting light sources 72, preferably, LEDs (e.g., 3 LEDs per side). The reflectors 70 provide integrated peripheral lighting. Each reflector 70 serves a very important function in that it takes the light that would be directed perpendicular to the circuit board 66 and projects it off to the side of the light assembly 10.

At least one second reflector 74 (or "spot reflector") is operably mounted to the circuit board 66. A plurality of light sources 14 that are preferably central light sources or forward projecting, preferably, LEDs (e.g., nine LEDs) have the reflector 74 installed over them which is the part of the light assembly 10 that directs the light in a forward fashion. The second reflector 74 has a plurality of chambers 76 dividing adjacent light sources 14. Nine operably connected together funnel like or paraboloid of revolution like shaped chambers 14 are provided, e.g., with three chambers 14 per column. However, it is understood that alternative shapes and arrangements are contemplated depending on the application without departure from the scope of the present invention. It is further understood that the chambers 76 can be in a predetermined closer or tighter configuration, to provide higher visibility at greater distances, depending on the application without departure from the scope of the present invention.

At least one lens 78 is operable mounted which sits on the O-ring 58 and is centered in the assembly 10 by at least one alignment feature 80 built into the housing 16. Preferably, the at least one alignment feature is a plurality of locator pins. The locator pins speed up production time by the assembly personnel not having to align each lens 78 to each housing 16 by eye. Optionally, the lens 78 includes patterns, e.g., such as vertical parallel lines generally over at least one chamber 76, used under predetermined driving conditions, depending on the application without departure from the scope of the present invention.

The bezel 18 is placed over the lens 78 and operably connected to the housing 16 to draw the housing 16, bezel 18 and lens 78 together to form a weather tight seal. Preferably, the bezel 18 is secured from the back of the housing 16 using a plurality of fasteners 82 (e.g., bolts, six 6 mm button head bolts, etc) which compresses the bezel 18, lens 78 and housing 16 together creating a water tight seal. The bezel 18 has the air channel portions 84 that directly align with and abut the air channels 86 of the housing 16 forming air channels 36 of the cooling system 12. Thus, another function of the bezel 18 is forming part of the cooling system 12 which helps direct air from the front face of the light through the bezel 18 and housing 16 (via air channels 36) and out the rear of the light increasing the assembly's 10 cooling capacity and streamlining air flow over the cooling fins 30.

At least one additional aperture 88 is also provided in the bezel 18 to allow light from the plurality of lighting sources 14 on the circuit board 66 to exit the bezel 18 and illuminate through the lens 78. Light from the plurality of lighting sources 14 on the circuit board 66 also exits to the lens 78 from gaps 90 between the bezel 18 and the second reflector 74.

The lighting sources 14 are white and/or any predetermined color combinations and patterns. The predetermined colors are selectively changeable.

Preferably the housing 16 is cast aluminum. Other materials are contemplated depending on the application without departure from the scope of the present invention.

A known light attempts to solve integrated side lighting. This light has a different size and shape and is different in how the light is dispersed. The known light is a smaller 2-3 inches and square shape, whereas the present invention incorporates a larger diameter, e.g., 8" diameter, round light. In addition, the light dispersed by the known light's side projecting optics has harsh cutoffs throughout the field of view, whereas the present invention is smooth throughout the entire field of view and blends much more seamlessly with the center forward projecting light.

Referring now to FIGS. 11-14 generally, there is provided a lighting assembly 110 (or "assembly"), according to the present invention, that provides integrated forward projecting light and side lighting to give a user a broader field of light. The assembly 110 includes a cooling system, indicated generally at 112, suitable for dissipating the heat generated by a plurality of light sources and electrical components of the assembly 110. The assembly 110 also provides a daytime running light mode to increase visibility during the day and night.

The lighting assembly 110 has at least one housing 115 (preferably, a rear housing) operably connected to a bezel 116 (preferably, a front bezel). At least one mounting bracket 104 is operably connected to the housing 115 by a plurality of fasteners (e.g., bolts 106 and washers 107). The mounting bracket 104 is mountable to a surface, such as, but not limited to, a surface of a motor vehicle component, using at least one fastener (e.g., bolts and washers).

The housing 115 has at least one heat transportation feature 117, which is preferably at least one air channel, most preferably, a plurality of air channels. The housing 115 also has at least one heat dissipating member 120, which is preferably a plurality of cooling fins. The cooling system 112 includes at least 119,120. Preferably, the cooling system 112 includes a plurality of cooling channels 119 (e.g., direct duct cooling channels) formed through the bezel 116 and housing 115 and a plurality of cooling fins 120 formed in at least the rear of the housing 115. The air channels 119 have a front opening in the front face of the bezel 116 and a rear opening in the rear of the housing 115. Alternative placement of the openings are contemplated depending on the application without departure from the scope of the present invention.

The housing 115 is the base of the entire light 110 that each component is operably secured to, such as a connector (e.g., 4-pin connector) by at least one fastener (e.g., by two screws). Two other functions of the rear housing 115 are to dissipate heat through the cooling fins 120 formed on the back and the air channels 119 in each of the four corners, as well as provide a way for the mounting bracket 104 to be bolted to the assembly 110. Preferably, bolted through two tapped apertures on each side of the housing 115 and mounting bracket 104, respectively, using fasteners.

While openings for four groups of four air channels 119 each are depicted toward the corners of the bezel 116, it is understood that more or less groups, and more or less channels 119 per group, and alternative predetermined locations on the bezel 116 (and/or housing 115) are contemplated depending on the application without departure from the scope of the present invention. It is further understood that, alternatively, the air channels 119 can be curved or have any other predetermined geometry and path through the assembly 110 without departure from the scope of the present invention.

Figure 14:
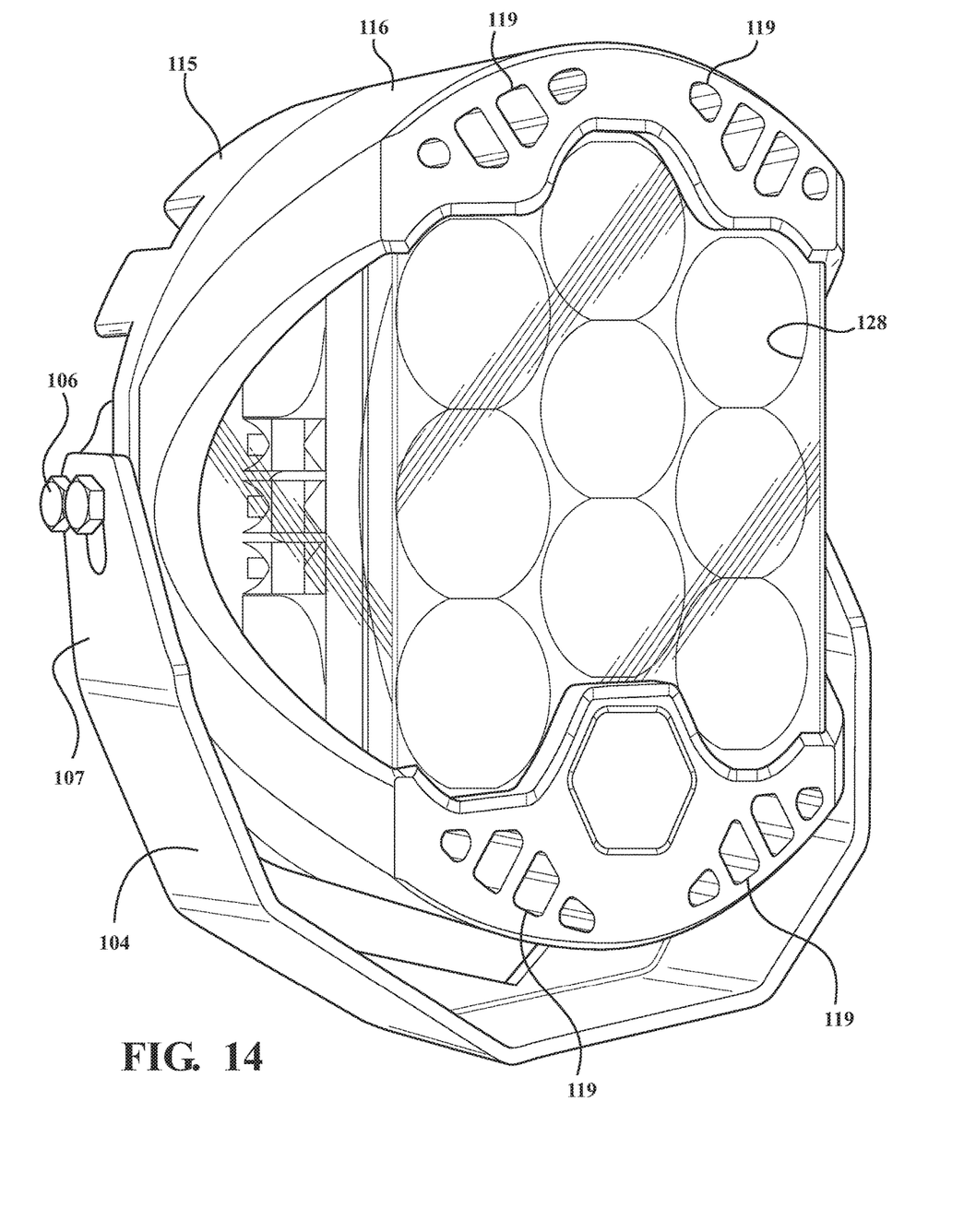
FIG. 14 is a front perspective view of the lighting assembly of FIGS. 11-12 depicting a mounting bracket, according to the present invention.

The mounting bracket 104 is securable to a surface using at least one fastener.

At least one O-ring is mounted to the housing 115. Preferably, an O-ring is installed into an O-ring grove in the housing 115 that has a plurality of pressure in place features (PIPs) to hold itself in place during assembly. The pips are small tabs designed into the O-ring that compress when pushed into the grove in the housing 115 creating pressure to hold the O-ring in place. Alternative seal(s) and predetermined location(s) are contemplated without departure from the scope of the present invention.

At least one thermal interface, which is preferably a thermal gap pad, is placed on the front of the housing 115. The thermal gap pad has a primary function of drawing the heat from a circuit board. The circuit board is mounted on top of the thermal gap pad using a plurality of fasteners, e.g., four board screws, secured to the rear housing 115 where the heat is dissipated into the surrounding air via the cooling fins 120.

A pair of reflectors 108 are operably mounted to the circuit board around side projecting light sources 126, preferably, LEDs (e.g., 3 LEDs per side). The reflectors 108 provide integrated peripheral lighting. Each reflector 108 serves a very important function in that it takes the light emission that would be directed perpendicular to the circuit board and projects it off to the side of the light assembly 110.

A second reflector 102 is operably mounted to the circuit board. Central light sources 127, preferably, LEDs (e.g., 9 LEDs) have the reflector 102 installed over them which is the part of the light that directs the light in a forward fashion. The second reflector 102 has a plurality of chambers 129 dividing adjacent light sources 127. Nine operably connected together funnel like or paraboloid of revolution like shaped chambers 129 are provided, e.g., with three chambers 129 per column. However, it is understood that alternative shapes and arrangements are contemplated depending on the application without departure from the scope of the present invention.

A lens 103 is operable mounted which sits on the O-ring, or alternative predetermine feature, and is centered in the assembly 110 by at least one alignment feature built into the housing 115. Preferably, the at least one alignment feature is a plurality of locator pins. The locator pins speed up production time by the assembly personnel not having to align each lens 103 to each housing 115 by eye.

The bezel 116 is placed over the lens 103 and operably connected to the housing 115 to draw the housing 115, bezel 116 and lens 103 together to form a weather tight seal. Preferably, the bezel 116 is secured from the back of the housing 115 using a plurality of fasteners (e.g., bolts) which compresses the bezel 116, lens 103 and housing 115 together creating a water tight seal. The bezel 116 has air channels that directly align with the air channels of the housing 115 in an abutting arrangement to form substantially continuous air channels 119 of the cooling system 112. Thus, another function of the bezel 116 is forming part of the cooling system 112 which helps direct air from the front face of the light through the bezel 116 and housing 115 (via air channels 119) and out the rear of the light increasing the assembly's 110 cooling capacity and streamlining air flow over the cooling fins 120.

Preferably the housing 115 is machined aluminum, e.g., hard anodized machined aluminum. Other materials are contemplated depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lighting assembly, comprising
at least one bezel;
at least one lens located within said bezel;
at least one housing operably connected to said bezel;
a cooling system including a plurality of direct duct cooling channels provided through said housing and bezel and a plurality of heat dissipating members provided on a rear surface of said housing;
at least one pair of reflectors operably connected adjacent to a plurality of light sources, said pair of reflectors providing integrated peripheral lighting, when desired;
at least one second reflector operably connected adjacent to a plurality of light sources, said at least one second reflector providing forward projecting lighting, when desired.

2. The lighting assembly of claim 1, wherein said bezel is connected to said housing by a plurality of fasteners to draw and compress said housing, bezel and lens together creating a weather tight seal.

3. The lighting assembly of claim 1, further comprising at least one circuit board, wherein the plurality of light sources are operably connected to the circuit board.

4. The lighting assembly of claim 1, further comprising at least one thermal interface feature operably coupled to said housing to draw heat from a circuit board and transmit the heat to said housing for dissipating the heat to the atmosphere via the cooling system.

5. The lighting assembly of claim 1, wherein said plurality of heat dissipating members are a plurality of cooling fins.

6. The lighting assembly of claim 1, further comprising at least one O-ring seal with installation features that operably engage a groove formed in the housing creating pressure to hold said seal in place on said housing.

7. The lighting assembly of claim 1, further comprising alignment locating features operable to align the lens and housing.

8. The lighting assembly of claim 1, wherein said plurality of heat dissipating members are a plurality of cooling fins, and said cooling system directs air from the front surfaces of the light through the bezel and housing and out toward the rear of the light, which increases the light assembly's cooling capacity and streamlines air flow over the plurality of fins.

9. The lighting assembly of claim 1, further comprising a mounting bracket operably coupled to the housing operable for mounting to a surface, wherein said mounting bracket is operably shaped to direct air flow to said plurality of cooling fins.

10. The lighting assembly of claim 1, wherein said integrated peripheral lighting and said forward projecting lighting provides at least about a 200° range of light.

11. A lighting assembly with forward light projection and peripheral light projection, comprising
   a housing operably connected to a bezel, said housing have a plurality of rear cooling fins;
   a cooling system including at least one air channel formed through the bezel and housing;
   a plurality of light sources;
   at least one spot reflector located over a portion of said plurality of light sources;
   at least one peripheral lighting reflector located over any remaining of said plurality of light sources;
   wherein said spot reflector directs light from said portion of lighting sources in a forward fashion and said peripheral lighting reflector directs light from said remaining light sources outward from the side of the lighting assembly.

12. The lighting assembly of claim 11, wherein one peripheral lighting reflector is connected on both sides of the lighting assembly and one spot reflector is connected therebetween.

13. The lighting assembly of claim 11, further comprising at least one circuit board, wherein the plurality of light sources are operably connected to the circuit board.

14. The lighting assembly of claim 13, further comprising at least one thermal feature operably coupled to said housing to draw heat from said circuit board and transmit the heat to said housing for dissipating the heat to the atmosphere.

15. The lighting assembly of claim 11, further comprising at least one seal operably secured to said housing.

16. The lighting assembly of claim 11, wherein said seal is an O-ring with installation features that operably engage a groove formed in the housing creating pressure to hold said seal in place on said housing.

17. The lighting assembly of claim 11, further comprising a lens, wherein said bezel is located over said lens and said bezel is secured to said housing creating a weather tight sealed lighting assembly.

18. The lighting assembly of claim 11, wherein the bezel has a front opening into the air channel and the housing has a rear opening exiting the air channel to allow air to travel from the front to the back of the lighting assembly.

19. The lighting assembly of claim 11, further comprising a mounting bracket operably coupled to the housing operable for mounting to a surface, wherein said mounting bracket is operably shaped to direct ambient air flow to said plurality of cooling fins.

20. A lighting assembly, comprising
   at least one bezel;
   at least one lens located within said bezel;
   at least one housing operably connected to said bezel, said housing formed of cast aluminum;
   a plurality of lighting sources operably mounted to a circuit board;
   a thermal gap pad provided between the circuit board and housing, said thermal gap pad drawing heat from the circuit board;
   at least one pair of side reflectors operably connected adjacent to said plurality of light sources, said pair of reflectors providing integrated peripheral lighting, when desired;
   at least one second reflector operably connected adjacent to said plurality of light sources, said at least one second reflector providing forward projecting lighting, when desired, wherein said integrated peripheral lighting and forward projecting lighting provides a predetermined broad field of light; and
   a cooling system including at least a plurality of direct duct cooling provided through said housing and bezel and a plurality of cooling fins provided on a rear surface of said housing and extending through said direct duct cooling to form a plurality of channels, wherein said cooling system dissipates heat generated from said plurality of light sources and circuit board.

* * * * *